United States Patent Office 3,472,800
Patented Oct. 14, 1969

3,472,800
COLD CRACK-FREE RIGID URETHANE FOAMS
William C. Kuryla, St. Albans, W. Va., and John W. Childers, Jr., Charlotte, N.C., assignors to Union Carbide Corporation, a corporation of New York
No Drawing. Filed Jan. 3, 1967, Ser. No. 606,534
Int. Cl. C08g 22/44
U.S. Cl. 260—2.5                    4 Claims

ABSTRACT OF THE DISCLOSURE

An improvement in the production of rigid polyurethane foams from sucrose-based polyols and phosphorus-containing polyols is described. The improvement resides in the use of a small, carefully controlled amount of a particular isocyanate in the foam formulation. The isocyanate is a reaction product of an excess of tolylene diisocyanate and a diol, preferably dipropylene glycol. Heretofore, rigid urethane foams prepared from sucrose-based polyols and phosphorus-containing polyols had a marked tendency to crack at the interface between two pours of urethane foam when exposed to low temperature. The foams made in accordance with the present invention have much less tendency to crack at the interface between two pours of foam when the foam is subjected to low temperature, and therefore the rigid foams of the invention have enhanced utility as insulation for refrigerated trucks and box cars, and the like.

---

The invention relates to an improvement in the production of rigid urethane foams. In a particular aspect, the invention relates to an improvement in the production of rigid urethane foams prepared from a mixture of sucrose-based polyols and phosphorus-containing polyols. In a more particular aspect, the invention relates to the use of small, carefully controlled amounts of a particular isocyanate, fully described hereinbelow, in the preparation of rigid urethane foams from sucrose-based polyol and phosphorus-containing polyols. The particular isocynate that is employed in this invention as a small, carefully controlled proportion of the isocyanate portion of the urethane foam, is a reaction product of an excess of tolylene diisocynate and a diol.

In the preparation of insulating structures for refrigerators, refrigerated box cars, and the like, the conventional method of using urethane foam in such insulating structures is to pour a urethane foaming mixture into a cavity which, when filled with urethane foam, comprises the principle insulating material of the insulating structure. Because of limitations on the height which the urethane foam mixture can rise to fill, it is the custom in the industry to first pour a foaming mixture which will rise to fill part of the cavity with rigid urethane foam. Then a second portion of foaming mixture is poured into the cavity on top of the already formed material. This procedure is repeated as many times as is needed to fill the cavity. It has been found that the interface that is formed between the already gelled rigid urethane foam and the urethane foam that is formed by pouring foaming mixture on top of said already gelled urethane foam, is subject to separation or cracking when the insulation is subjected to extremely cold, moist conditons. This problem is termed cold cracking. The present invention is concerned with a solution to this problem of cold cracking.

The urethane foams of this invention are prepared by reacting a mixture of polyols with an organic isocyanate mixture in the presence of a blowing agent. The polyol mixture contains as essential ingredients a sucrose-based polyol and a phosphorus-containing polyol. The sucrose-based polyols are prepared by reacting sucrose with propylene oxide or a mixture of propylene oxide and ethylene oxide in such proportions that a polyol having a hydroxyl number of from about 300 to about 600, and preferably from about 400 to about 500 is prepared. When a mixture of propylene oxide and ethylene oxide is employed, it is preferred that the ethylene oxide constitute not more than about 20 weight percent of the alkylene oxide mixture. The preparations and nature of these alkylene oxide adducts of sucrose are well known in the art.

The second essential polyol for use in this invention is a phosphorus-containing polyol. Among the useful types of phosphorus-containing polyols that can be employed in the invention are the hydroxyalkyl polyphosphates that are produced by reacting an alkylene oxide, preferably ethylene oxide, propylene oxide, or butylene oxide, or mixtures thereof, with a polyphosphoric acid, as disclosed in U.S. Patent 3,099,676. A particularly preferred hydroxyalkyl polyphosphate is that prepared by reacting propylene oxide with either tripolyphosphoric acid or with tetrapolyphosphoric acid. The hydroxyalkyl polyphosphate employed in this invention will normally have a hydroxyl number of from about 200 to about 500, and preferably from about 250 to about 400. A second useful class of phosphorus-containing polyols are the O,O'-disubstituted N,N-bis(hydroxyalkyl)aminoalkylphosphonates, such as those that are described in U.S. Patent No. 3,076,010. Specific illustrative examples include O,O'-diethyl N,N-bis(2-hydroxyethyl)aminomethylphosphonate, O,O'-bis(2-chloroethyl) N,N-bis(2-hydroxyethyl)aminomethyl phosphonate, O,O-diphenyl N,N-bis(2-hydroxypropyl)aminomethyl phosphonate, and O,O'-bis(4-hydroxybutyl) N,N-bis(2-hydroxyethyl)aminoisopropyl phosphonate. The first mentioned of these four compounds is preferred.

Another useful phosphorus-containing polyol comprises the tris(polyalkylene glycol) phosphites that can be produced by reacting 3 or more moles of a polyalkylene glycol with one mole of, for example, triphenyl phosphite in an ester exchange reaction as described in U.S. Patent No. 3,009,939. Among the tris(polyalkylene glycol) phosphites that deserve particular mention are tris(dipropylene glycol) phosphite and other tris(polypropylene glycol) phosphites, tris(diethylene glycol) phosphite, and the like. The tris(polypropylene glycol) phosphites, and particularly tris(dipropylene glycol) phosphite, are preferred. Another useful class of phosphorus-containing polyols are the tertiary phosphites comprising the poly(alkylene glycol phosphite) esters that can be prepared by reacting from about 2 to about 3 moles of polyalkylene glycol with one mole of, for example, triphenyl phosphite in an ester exchange reaction as described in U.S. Patent No. 3,081,331. The preferred poly(alkylene glycol phosphite) esters are those that are derived from dipropylene glycol. Many other phosphates, phosphites, and phosphonates that are well known in the urethane foam art can be used in this invention.

The preferred phosphorus-containing polyols for use in this invention are the hydroxyalkyl polyphosphates or the O,O-disubstituted N,N-bis(hydroxyalkyl)aminoalkyl phosphonates.

In addition to the sucrose-based polyol and the phosphorus-containing polyol, one or more additional polyols can be employed in producing urethane foams of the invention. Such additional polyols that can be employed are exemplified by the following classes of compositions:

(a) polyoxyalkylene polyols including alkylene oxide adducts of, for example water, ethylene glycol, diethylene glycol, propylene glycol, dipropylene glycol, glycerol, 1,2,5-hexanetriol, 1,1,1-trimethylolethane, pentaerythritol, sorbitol, alpha-methyl glucoside, ethlyenediamine, diethylenetriamine, phenol-anilene-formaldehyde ternary condensation products, anilene-formaldehyde condensation products, and the like, are useful. The alkylene oxides employed in producing polyoxyalkylene polyols normally have from 2 to 4 carbon atoms. Propylene oxide and mixtures of propylene oxide with ethylene oxide are preferred.

(b) Polyesters of polyhydric alcohols and polycarboxylic acids such as those prepared from an excess of ethylene glycol, propylene glycol, 1,1,1-trimethylolopropane, glycerol, or the like reacted with phthalic acid, adipic acid, and the like, are useful polyols.

(c) Lactone polyols prepared by reacting a lactone such as epsilon-caprolactone or a mixture of epsilon-caprolactone and an alkylene oxide with a polyfunctional initiator such as polyhydric alcohol, an amine, or an amino alcohol, are also useful.

The foregoing are merely illustrative of the many polyols that can be employed in conjunction with the sucrose-based polyol and the phosphorus-containing polyol that are essential ingredients in the polyol mixture employed to produce the urethane foams of the invention. It is in general preferred that at least 50 weight percent of the polyol mixture employed to prepare the urethane foams of the invention consist of the sucrose-based polyol and the phosphorus-containing polyol. The sucrose-based polyol and the phosphorus-containing polyol can usually be employed in proportions varying from about 90 to 10 to about 10 to 90 weight percent, respectively, the polyol mixture as a whole normally possesses an average hydroxyl number of from about 200 to about 600. As is well known in the art, the hydroxyl number is defined as the number of milligrams of potassium hydroxide required for the complete neutralization of the hydrolysis product of the fully acetylated derivative prepared from one gram of polyol. The hydroxyl number can also be defined by the equation:

$$OH = \frac{56.1 \times 1000 \times f}{M.W.}$$

wherein OH=hydroxyl number of the polyol, $f$=average functionality, that is, average number of hydroxyl groups per molecule of polyol, and M.W. equals average molecular weight of the polyol.

The isocyanate employed to produce the urethane polymers of this invention is a mixture of a conventional organic polyisocyanate with the tolylene diisocyanate-diol reaction product. The conventional organic polyisocyanate that is employed, either singly or as a mixture of one or more such conventional isocyanates, includes any of the organic polyisocyanates that are normally employed in the production of rigid polyurethane foams. Specific illustrative examples include polyphenylmethylene polyisocyanates that are produced by phosghenation of aniline-formaldehyde condensation products, crude tolylene diisocyanate as disclosed in U.S. Patent No. 3,215,652, and reaction products of an excess of an organic polyisocyanate such as tolylene diisocyanate with a triol or higher polyol.

The principle point of novelty of this invention resides in the use of carefully controlled amounts of the reaction product of tolylene diisocyanate and a diol in the isocyanate portion of the reaction mixture. Among the diols that can be employed to prepare this reaction product are dipropylene glycol, tripropylene glycol, dibutylene glycol, 2,2-dimethyl-3-hydroxyprophyl 2,2-dimethyl-3-hydroxypropionate, and 2-methyl-2-hydroxymethylbutyl 2-methyl-2-hydroxymethyl-butyrate. The preferred diol is dipropylene glycol, i.e., bis(2-hydroxy-2-methylethyl) ether. The tolylene diisocyanate that is employed to produce this reaction product is normally a mixture of 2,4- and 2,6-tolylene diisocyanate, with the 80/20 mixture of 2,4- and 2,6-tolylene diisocyanate being particularly preferred. The preferred method for producing this reaction product is to slowly add the diol to the tolylene diisocyanate, thereby maintaining at all times an excess of isocyanato to hydroxyl groups. The temperature of the reaction that is employed to produce this reaction product can be varied over a fairly wide range, for instance, from about 20° C. and lower to about 100° C. and higher. The preferred reaction temperature is in the range of from about 25° C. to about 80° C. The reaction time depends, in part, upon factors such as temperature, particular nature and proportion of the reactants, and the like. For instance, the diol addition time can be from about one hour to about five hours, and the addition can be followed by a subsequent reaction period which can be from about one-half hours to about six hours. One desirable method for producing a reaction product is to slowly add the diol to the tolylene diisocyanate with the reactants being at about room temperature (i.e., about 25° C.), and to allow the reaction mixture to rise to about 80° C. The reaction is then maintained at about 80° C. for a period of about 2 hours, and is then cooled to room temperature.

The molar ratio of tolylene diisocyanate to diol is at least 2:1 and can be as high as about 6:1. Preferred molar ratios of tolylene diisocyanate to diol are found in the range of from about 3:1 to about 5:1. While higher ratios than 6:1 can be employed, if desired, the beneficial effect begins to diminish as less diol is employed. At ratios close to 2:1, the viscosity of the reaction product becomes very high which makes processing difficult. The best balance of low viscosity to enable easy processing, and enhancement of properties due to the presence of the diol, has been found in the said preferred range of from about 3:1 to about 5:1.

The tolylene diisocyanate-diol reaction product is employed in a carefully controlled amount in preparing the urethane foams of the invention. For example, the said reaction product is normally employed in proportions of from about 15 weight percent to about 25 weight percent of the isocyanate portion of the reaction mixture that is employed to produce the urethane foams of the invention. The preferred proportion is from about 17 to about 23 percent of tolylene diisocyanate-diol reaction product in the isocyanate portion of the reaction mixture, all of these percentages being based upon the weight of organic polyisocyanate employed (that is, the weight of the conventional organic polyisocyanate plus the tolylene diisocyanate-diol reaction product).

The urethane foams of the invention are normally prepared by conventional techniques. For example, the amount of organic polyisocyanate mixture that is employed is generally sufficient to provide a ratio of from about 1 to about 1.3 equivalents of isocyanate per equivalent of active hydrogen in the reaction mixture, and preferably a ratio of from about 1.05 to about 1.1 equivalents of isocyanate per reactive hydrogen. The alcoholic hydroxyl groups and water, if water is present as the blowing agent, normally comprise the said reactive hydrogens. The foaming of the reaction mixture can be accomplished by employing a small amount of water in the reaction mixture (for example, from about 0.5 to 5 weight percent of water, based on total weight of the reaction mixture), or through the use of blowing agents which are vaporized by the exotherm of the isocyanate-reactive hydrogen reaction, or by a combination of these two methods. All of these methods are known in the art. It is preferred to employ as a blowing agent a halogen-substituted aliphatic hydocarbon which has a boiling point between about −40° C. and 70° C., and which vaporize at or below the temperature of the foaming mass. For example, trichloromonofluoromethane is a highly preferred blowing agent. Other useful blowing agents include dichlorodifluoromethane, 1,1 - difluoro - 1,2,2 - trichloroethane and other blowing agents that are well known in the art. The amount of blowing agent that is employed is a variable that is well known in the art.

A catalyst can also be employed in the reaction mixture in order to accelerate the isocyanate-reactive hydrogen reaction. Such catalysts include a wide variety of compounds, for example, tertiary amines such as N-methylmorpholine, N,N,N'-tetramethyl-1,3-butanediamine, 1,4-diazabicyclo[2.2.2]octane bis[2 - (N,N - dimethylamino)

ethyl] ether, and the like. Also useful as catalysts are organic tin compounds such as stannous octoate, dibutyltin dilaurate, dibutyltin diacetate, and the like. Many combinations of catalysts can be employed, for instance, it is at times useful to employ one or two tertiary amines in combination with an organotin compound such as dibutyltin dilaurate. The catalyst is employed in known catalytic amounts such as from about 0.05 weight percent to about 1 weight percent based on weight of polyol. Of course, when an aliphatic amine-based polyol is employed in the reaction mixture, this polyol can also act as a catalyst and the proportions of catalysts that were indicated immediately above are of course not pertinent for such a case.

In the production of urethane foams, it is useful in many cases to employ a surfactant which serves as a cell size regulator, and to some degree as a cell stabilizer, in the production of the rigid urethane foams. Polysiloxane-polyoxyalkylene block copolymers are particularly useful surfactants for this purpose. Among the polysiloxane-polyoxyalkylene block copolymers that are useful are those that are disclosed in U.S. Patents 2,834,748 and 2,917,480 (Bailey et al.) and 2,846,458 (Haluska). The surfactant is normally employed in amounts of from about 0.01 to about 2 weight percent, based on weight of polyol.

An excellent summary of urethane polymer chemistry and technology is found in the text by Saunders and Frisch, "Polyurethanes: Chemistry and Technology," Interscience Publishers, New York. Part I "Chemistry," was published in 1963 and Part II "Technology," was published in 1964.

The urethane foams of this invention have enhanced utility for the production of insulation for refrigerators, refrigerated trucks and box cars, and the like. This enhanced utility stems from the unique improvement in properties that was described above. This improvement is the resistance to cracking at the interface between two pours of urethane foam when the foam is exposed to low temperatures.

The invention is illustrated by the examples below.

The materials that were employed in the examples are identified as follows (all parts are by weight, unless otherwise indicated).

Polyols

Polyol A—a polyol made by the base-catalyzed addition of a mixture of ethylene oxide and 1,2-propylene oxide to sucrose, to an average hydroxyl number of about 450. The polyol contains from 12 to 16 wt. percent oxyethylene groups.

Polyol B—a polyol made by the base catalyzed addition of 1,2-propylene oxide to sucrose, to an average hydroxyl number of about 450.

Polyol C—a polyol made by the base catalyzed addition of an 88:12 mixture of 1,2-propylene oxide and ethylene oxide to an aniline-phenol-formaldehyde condensation product, to an average hydroxyl number of about 320.

Polyol D—a phosphorus-containing polyol having an average hydroxyl number of about 450, with the following chemical structure:

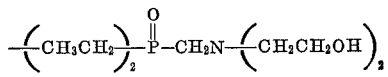

Polyol E—A polyol made by the addition of 1,2-propylene oxide to tetra-polyphosphoric acid (i.e., average no. of phosphorus atoms per chain is 4), to an average hydroxyl number of about 300

Isocyanates

Isocyanate A—a mixture composed of the following ingredients:

Parts:
50—Reaction product of 35 parts of polyol E and 65 parts of tolylene diisocyanate.
50—A polyphenylmethylene polyisocyanate having an NCO equivalent weight of about 134 and an average molecular weight of about 375 ("PAPI," a commercial product marketed by the Upjohn Company).
6.2—Tris(2-chloroethyl) phosphate.
1.1—Surfactant A, a composition of the formula:

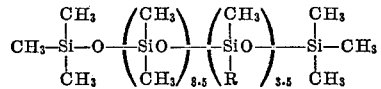

wherein R is a group of the formula

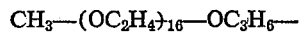

0.1—Benzoyl chloride.

Isocyanate B—same as isocyanate A without the tris(2-chloroethyl) phosphate.
Isocyanate C—an isocyanate having 30 percent NCO composed of: 100 parts of a quasi-prepolymer prepared from 77 parts of tolylene diisocyanate and 23 parts of a polyol prepared by adding propylene oxide to sorbitol to a hydroxyl number of 490; and 1.4 parts of surfactant A.
Isocyanate D—the reaction product of 4 parts of tolylene diisocyanate with 1 part of dipropylene glycol.

Others

Surfactant B—a composition of the formula:

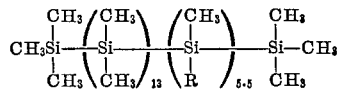

wherein R has the formula $HO(C_2H_4O)C_3H_6$.
Amine A—N,N-dimethylethanolamine.
Amine B—33 weight percent 1,4-diazabicyclo[2.2.2]octane in dipropylene glycol.
Fluorocarbon A—trichlorofluoromethane.

EXAMPLES 1–5

Foaming procedure

A series of rigid urethane foams were prepared by pouring a foaming mixture into the cavity of a plywood jig having an internal cross section of 2 inches by 10 inches and a height of 8 feet. A sand-blasted aluminum sheet covered one face of the cavity, with the rear face being plywood and both sides being wooden spacer strips. First, sufficient foaming mixture was poured into the cavity to fill it with foam to a height of about 6 feet. Fifteen minutes after the first pour, a second pour was added which contained sufficient foaming mixture to slightly overfill the cavity. The foaming mixture was produced by conventional hand batch techniques. Fifteen minutes after the second pour, the foam panel was removed from the jig and allowed to cure overnight at ambient temperatures. The foam panel, as removed from the jig, is bonded to the aluminum sheet that covered one face of the cavity.

Cold aging procedure

After the foam panel has cured at ambient temperature overnight, the excess foam (overfill) is cut off flush with the top of the mold. The panel is then cut in half. The bottom half is discarded and the top half, containing the interface of the two foam pours, is subject to the cold aging test.

A ¾ by 1½ inch wood strip is nailed across each end of the top half of the foam panel. The panel is then placed in a cold box maintained at −20° C. for 24 hours. The panel is then removed from the cold box, the aluminum face is stripped off and the condition of the foam near the interface of the two pours is observed. The panel is then cut vertically in half, thus exposing the foam from the aluminum face back to the rear plywood face, including any cracks or voids in the foams. The extent of cracking is determined by measuring the distance between the foam faces at the widest point. If the foam separates from the wooden side of the mold, the extent of this crack is determined by measuring from the interface downward and recording the length of the crack.

Table I, below, displays the formulations and extent of cold cracking for five urethane foams. Each foam formulation also contained 1.5 parts of amine A catalyst, 0.5 part of surfactant A, and 36 parts of fluorocarbon A (except Example 4, which contained 40 parts of fluorocarbon A).

TABLE I

| Example | Formulation, parts | | | | Cold cracking | |
|---|---|---|---|---|---|---|
| | Polyol A | Polyol D | Isocyanate A | Isocyanate D | Left side (inches) | Center cross section (inches) |
| 1 | 80 | 20 | 80 | 20 | 0 | 0 |
| 2 | 80 | 20 | 100 | | 2 | 1/32 |
| 3 | 80 | 20 | 90 | 10 | 3 | 1/16 |
| 4 | 90 | 10 | 90 | 10 | 2 | 1/8 |
| 5 | 80 | 20 | 60 | 40 | 1 | 1/8 |

What is claimed is:

1. In a rigid urethane foam prepared by reacting, in the presence of a blowing agent, a polyol mixture having an overall hydroxyl number of from about 200 to about 600 and containing at least 50 percent by weight of an alkylene oxide adduct of sucrose and a phosphorus-containing polyol, with an organic polyisocyanate mixture, the improvement which comprises employing in said organic polyisocyanate mixture the reaction product of a molar excess of tolylene diisocyanate with a diol, said reaction product being employed in said organic polyisocyanate mixture in an amount of from about 15 to about 25 weight percent, based on weight of said organic polyisocyanate mixture, wherein the molar ratio of said tolylene diisocyanate to said diol in said reaction product is from about 2:1 to about 6:1, and wherein said diol is selected from the group consisting of dipropylene glycol, tripropylene glycol, dibutylene glycol, 2,2-dimethyl-3-hydroxypropyl 2,2-dimethyl-3-hydroxypropionate, and 2-methyl - 2 - hydroxymethylbutyl 2-methyl-2-hydroxymethylbutyrate, whereby the resistance to cracking at pour interfaces of said rigid urethane foam when it is subjected to low temperature is enhanced.

2. The improvement of claim 1 wherein the molar ratio of said tolylene diisocyanate to said diol in said reaction product is from about 3:1 to about 5:1.

3. The improvement of claim 2 wherein said reaction product is employed in said organic polyisocyanate mixture in an amount of from about 17 to about 23 weight percent, based on the weight of said organic polyisocyanate mixture.

4. The improvement of claim 3 wherein said diol is dipropylene glycol.

References Cited

UNITED STATES PATENTS 3,261,814 7/1966 Friedman _____ 260—77.5
3,369,014 2/1968 Booth _____ 260—953

DONALD E. CZAJA, Primary Examiner

M. B. FEIN, Assistant Examiner

U.S. Cl. X.R.

264—55

PO-1050
(5/69)

UNITED STATES PATENT OFFICE
CERTIFICATE OF CORRECTION

Patent No. 3,472,800.          Dated October 14, 1969

Inventor(s) William C. Kuryla, and John W. Childers, Jr.

It is certified that error appears in the above-identified patent and that said Letters Patent are hereby corrected as shown below:

Column 5, lines 63 to 67, the formula should be corrected to delete the horizontal line going through the parenthesis mark at the far left side thereof.

SIGNED AND
SEALED
JAN 6 - 1970

(SEAL)
Attest:

Edward M. Fletcher, Jr.
Attesting Officer

WILLIAM E. SCHUYLER, JR.
Commissioner of Patents